United States Patent
Peralta Orta

(10) Patent No.: US 10,046,708 B1
(45) Date of Patent: Aug. 14, 2018

(54) SYSTEM TO ANGULARLY ADJUST A TRUNK FLOOR

(71) Applicant: GM GLOBAL TECHNOLOGY OPERATIONS LLC, Detroit, MI (US)

(72) Inventor: Lina Peralta Orta, Toluca (MX)

(*) Notice: Subject to any disclaimer, the term of this patent is extended or adjusted under 35 U.S.C. 154(b) by 0 days.

(21) Appl. No.: 15/676,088

(22) Filed: Aug. 14, 2017

(51) Int. Cl.
| | | |
|---|---|---|
| *B60R 7/02* | (2006.01) | |
| *B60R 5/04* | (2006.01) | |
| *B60R 13/01* | (2006.01) | |
| *B60N 2/36* | (2006.01) | |

(52) U.S. Cl.
CPC ............... *B60R 7/02* (2013.01); *B60R 5/04* (2013.01); *B60R 13/013* (2013.01); *B60N 2/36* (2013.01)

(58) Field of Classification Search
CPC .. B60R 5/04; B60R 5/041; B60R 7/02; B60R 13/01; B60R 13/011; B60R 13/013
USPC ...... 296/37.1, 37.16; 414/462–466, 598–600
See application file for complete search history.

(56) References Cited

U.S. PATENT DOCUMENTS

| | | | | |
|---|---|---|---|---|
| 2,014,019 A * | 9/1935 | Girl | ............... | B60R 5/04 224/42.13 |
| 2,091,069 A * | 8/1937 | Girl | ............... | B60R 5/04 224/42.32 |
| 2,091,070 A * | 8/1937 | Girl | ............... | B60R 5/04 224/42.32 |
| 2,094,401 A * | 9/1937 | Girl | ............... | B60R 5/04 224/42.32 |
| 3,572,514 A * | 3/1971 | Sauber | ............... | B66C 23/90 212/231 |
| 3,627,158 A * | 12/1971 | Kobasic | ............... | B60R 5/04 414/462 |
| 4,347,800 A * | 9/1982 | Culver | ............... | B63B 21/58 114/218 |
| 4,455,948 A * | 6/1984 | Torres | ............... | A47B 31/06 108/138 |
| 4,753,567 A * | 6/1988 | Achee, Sr. | ............... | A61G 3/0209 224/542 |
| 4,799,849 A * | 1/1989 | Miller | ............... | B60R 5/04 296/37.1 |
| 4,969,793 A * | 11/1990 | Pawl | ............... | B60R 5/04 187/269 |
| 5,301,992 A * | 4/1994 | Whitmore | ............... | B60R 5/04 224/542 |
| 6,709,038 B2 * | 3/2004 | Bienert | ............... | B60R 5/04 296/26.1 |
| 7,179,040 B2 * | 2/2007 | Masuda | ............... | B60R 5/04 187/211 |
| 7,992,912 B2 * | 8/2011 | Klotz | ............... | B60R 5/04 296/26.09 |

(Continued)

*Primary Examiner* — Dennis H Pedder

(57) ABSTRACT

A system to vary the angle of rotation between two surfaces is presented herein. One general aspect of this system includes a horizontally-oriented fixed surface. The system also includes a planar surface rotatably connected to one side of the fixed surface and configured to substantially cover the fixed surface. The system also includes a raising apparatus affixed to the fixed surface, the raising apparatus operatively connected to the planar surface, the raising apparatus operatively connected to the planar surface, where, based on the amount of downward force being applied to the planar surface, the raising apparatus lowers a portion of the planar surface in relation to the fixed surface so as to reduce the angle of rotation between the planar surface and fixed surface.

20 Claims, 5 Drawing Sheets

(56) References Cited

U.S. PATENT DOCUMENTS

| | | | |
|---|---|---|---|
| 9,828,222 B2* | 11/2017 | Nedelman | B65G 67/24 |
| 9,963,028 B1* | 5/2018 | Pachore | B60K 1/04 |
| 2004/0160076 A1* | 8/2004 | Masuda | B60R 5/04 |
| | | | 296/37.3 |
| 2010/0213754 A1* | 8/2010 | Dirr | B60P 1/28 |
| | | | 298/17 B |
| 2014/0343968 A1* | 11/2014 | Wilson | A61G 7/018 |
| | | | 705/3 |

* cited by examiner

SYSTEM TO ANGULARLY ADJUST A TRUNK FLOOR

INTRODUCTION

Many vehicle designs provide for an overabundance of space within their designated trunk area. This trunk space can be helpful when the vehicle owner wishes to use their vehicle to carry objects, such as groceries and consumer goods, from one location to another. During vehicle transit, however, lightweight and small objects tend to get spread around the trunk and forced into places that are hard to access, making their removal difficult without some kind of assistance. It is therefore desirable to install a system within the vehicle trunk which will support ease of access and removal of lightweight and small objects—especially upon the completion of vehicle transit.

SUMMARY

A system to vary the angle of rotation between two surfaces is presented herein. One general aspect of this system includes a horizontally-oriented fixed surface. The system also includes a planar surface rotatably connected to one side of the fixed surface and configured to substantially cover the fixed surface. The system also includes a raising apparatus affixed to the fixed surface, the raising apparatus operatively connected to the planar surface, the raising apparatus operatively connected to the planar surface, where, based on the amount of downward force being applied to the planar surface, the raising apparatus lowers a portion of the planar surface in relation to the fixed surface so as to reduce the angle of rotation between the planar surface and fixed surface.

Implementations may include one or more of the following features. The system where the fixed surface includes a lip configured to ensure the portion of the planar surface does not shift out of place while lowering in relation to the fixed surface. The system where the raising apparatus includes: a track configured to fasten to the fixed surface. The system may also include a rail configured to fasten to the planar surface; a plurality of bars, the bars being laterally orientated and connected at a cross section via a rotatable joint, each bar being of a different length, where one end of each bar is configured to connect to the rail and the opposite end is configured to be located in the track; one or more springs configured to be installed in the track and connected to the track end of the bars; and where the springs are configured to allow the track end of the bars to move from their respective default track position based on the amount of downward force being applied to the rail. The system where the track, rail, each of the plurality of bars, and one or more springs are manufactured from steel. The system where the system is installed within the trunk of a vehicle. The system where the fixed surface is a load floor of the trunk and the planar surface is a floor mat panel installed in the trunk. The system where the load floor includes a spare tire well. The system where the floor mat panel is constructed from a rigid material.

One general aspect includes a system vary the angle of rotation between a rigid floor mat panel surface and load floor located in a vehicle trunk, the angle of rotation based on the amount of weight placed in the vehicle trunk, the system including: the panel surface rotatably connected to the end of the load floor that abuts the vehicle trunk opening, the panel surface being configured to cover the load floor. The system also includes a raising apparatus being fastened to the load floor, the raising apparatus operatively connected to the panel surface, where the raising apparatus, based on the amount of weight placed on the panel surface, lowers the panel surface in relation to the load floor so as to minimize the angle of rotation between the panel surface and load floor.

Implementations may include one or more of the following features. The system where the load floor comprises a lip configured to ensure the panel surface does not shift out of place while lowering in relation to the load floor. The system where the raising apparatus includes: a track configured to fasten to the load floor. The system may also include a rail configured to fasten to the panel surface; a plurality of bars, the bars being laterally orientated and connected at a cross section via a rotatable joint, each bar being of a different length, where one end of each bar is configured to connect to the rail and the opposite end is configured to be located in the track; one or more springs configured to be installed in the track and connected to the track end of the bars; and where the springs are configured to allow the track end of the bars to move from their respective default track position based on the amount of weight placed on the panel surface. The system where the track, rail, each of the plurality of bars, and one or more springs are manufactured from steel.

One general aspect includes a method to vary the angle of rotation between two surfaces, the method including: providing a horizontally-oriented fixed surface. The method also includes providing a planar surface rotatably connected to one side of the fixed surface and configured to substantially cover the fixed surface. The method also includes providing a raising apparatus affixed to the fixed surface, the raising apparatus operatively connected to the planar surface, where, based on the amount of downward force being applied to the planar surface, the raising apparatus lowers a portion of the planar surface in relation to the fixed surface so as to minimize the angle of rotation between the planar surface and fixed surface. The method also includes allowing the raising apparatus to set the operatively connected planar surface at a default position, where the angle of rotation between the planar surface and fixed surface is maximized. The method also includes placing weight on the planar surface. The method also includes when substantial downward force is applied to the planar surface, allowing the raising apparatus to lower a portion of the planar surface in relation to the fixed surface until the angle of rotation between the planar surface and fixed surface is minimized.

Implementations may include one or more of the following features. The method further including: removing the downward force being applied to the planar surface. The method may also include allowing the raising apparatus to return the operatively connected planar surface to the default position. The method where the fixed surface comprises a lip configured to ensure the portion of the planar surface does not shift out of place while lowering in relation to the fixed surface. The method where the raising apparatus includes: a track configured to fasten to the fixed surface. The method may also include a rail configured to fasten to the planar surface; a plurality of bars, the bars being laterally orientated and connected at a cross section via a rotatable joint, each bar being of a different length, where one end of each bar is configured to connect to the rail and the opposite end is configured to be located in the track; one or more springs configured to be installed in the track and connected to the track end of the bars; and where the springs are configured to allow the track end of the bars to move from their respective default track position based on the amount of downward force being applied to the rail. The method where the track, rail, each of the plurality of bars, and one or more springs are manufactured from steel. The method where the fixed surface is a load floor of a vehicle trunk and the planar surface is a floor mat panel installed in the vehicle trunk. The method where the load floor includes a spare tire well. The method where the floor mat panel is constructed from a rigid material.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
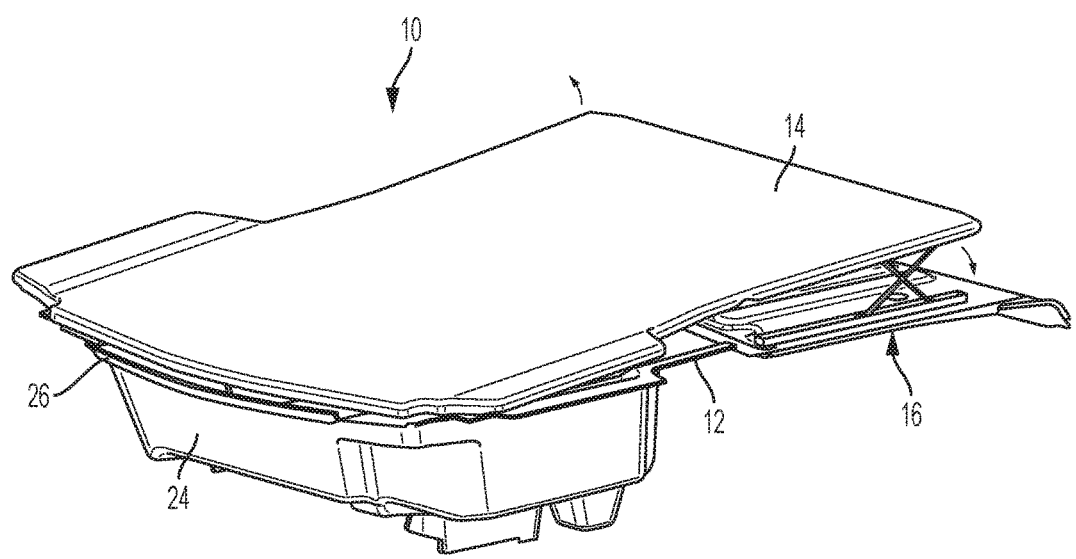
FIG. 1 is a perspective view of an exemplary vehicle trunk system according to an embodiment.
Figure 2:
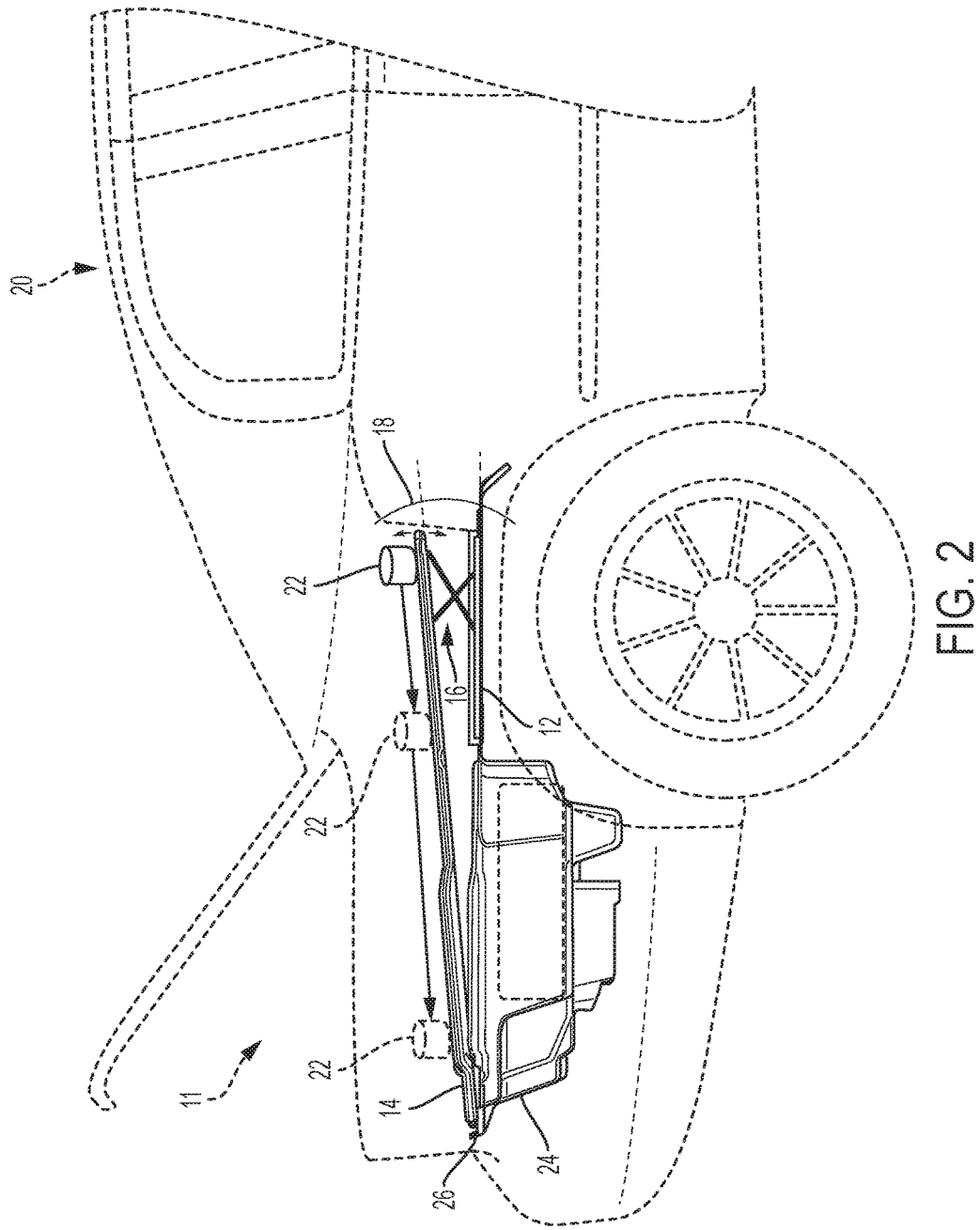
FIG. 2 is an environmental side view of an exemplary vehicle trunk system according to an embodiment.

As shown in FIGS. 1 and 2, a system to releasably set a vehicle trunk floor at an angle has generally been indicated by reference numeral 10. The system 10 is generally made of the load floor 12 fixed to the bottom of the vehicle trunk 11, a rigid floor mat panel 14 that is able to lay directly over load floor 12, and a raising apparatus 16 installed between load floor 12 and panel 14. As a result, raising apparatus 16 causes panel 14 to be positioned at an angle 18 with respect to floor 12, for example, an angle of thirty (30) degrees. Moreover, raising apparatus 16 will impermanently collapse when a significant amount of downward force is applied onto it. As follows, when substantial weight is placed on top of panel 14 (ten (10) pounds, for example), raising apparatus 16 will collapse and allow panel 14 rotatably lower downward and lay directly on top of load floor 12 (i.e., to minimize the angle between floor 12 and panel 14) while the weight is on panel. Conversely, however, when the weight is removed, raising apparatus 16 will spring back to its default state and cause panel 14 to return to its default orientation of being positioned at an angle 18 with respect to floor 12. Furthermore, as shown, when raising apparatus 16 is in a default state, panel 14 is oriented such that one side is downwardly sloped towards the rearward opening of trunk 11. Therefore, when small and lightweight objects 22 are placed in trunk 11 they will have a tendency to roll/slide towards the rear end of trunk 11. As such, a person (not shown) using vehicle 20 will less likely be required to inconveniently reach over, and all the way, to the opposite end of trunk 11 so they can grab a hold of any desired objects 22.

As can be seen, panel 14 may be made from rigid material and is rotatably connected to the end 24 of floor 12 which abuts the rearward opening of trunk 11. Panel 14 may, for example, be constructed from plastic, metal, wood, fiberglass, or any other material that will allow panel 14 to keep its shape while being angularly positioned and having one or more lightweight objects 22 resting on its surface. Carpeting or some other form of upholstery (not shown) may also cover panel 14 to make system 10 less noticeable when installed within trunk 11.

Both floor 12 and panel 14 meet at a fixation point to allow for the pivotal adjustment of panel 14. This point thus allows for variance of the angle of rotation between floor 12 and panel 14 without allowing panel 14 to physically shift out of its place within trunk 11. Slight shifting/free travel of the panel 14 may occur to enable panel 14 to lay flat on the top of floor 12, as well as pivotally rotate to be positioned at an angle 18 with respect to floor 12. The floor end 24, which abuts the rearward opening of trunk 11, may also include a vertical lip 26 to ensure panel 14 does not shift to the extent that panel 14 becomes out of place while it is rotatably lowering downward or returning to its angled orientation. Lip 26 may also provide a backstop for the edge of panel 14 which enforces and facilitates the panel's rotational movement. When properly installed and lowered down, panel 14 will cover the entirety of the horizontally-oriented floor 12, to include any existing spare tire well 28.

Figure 3:
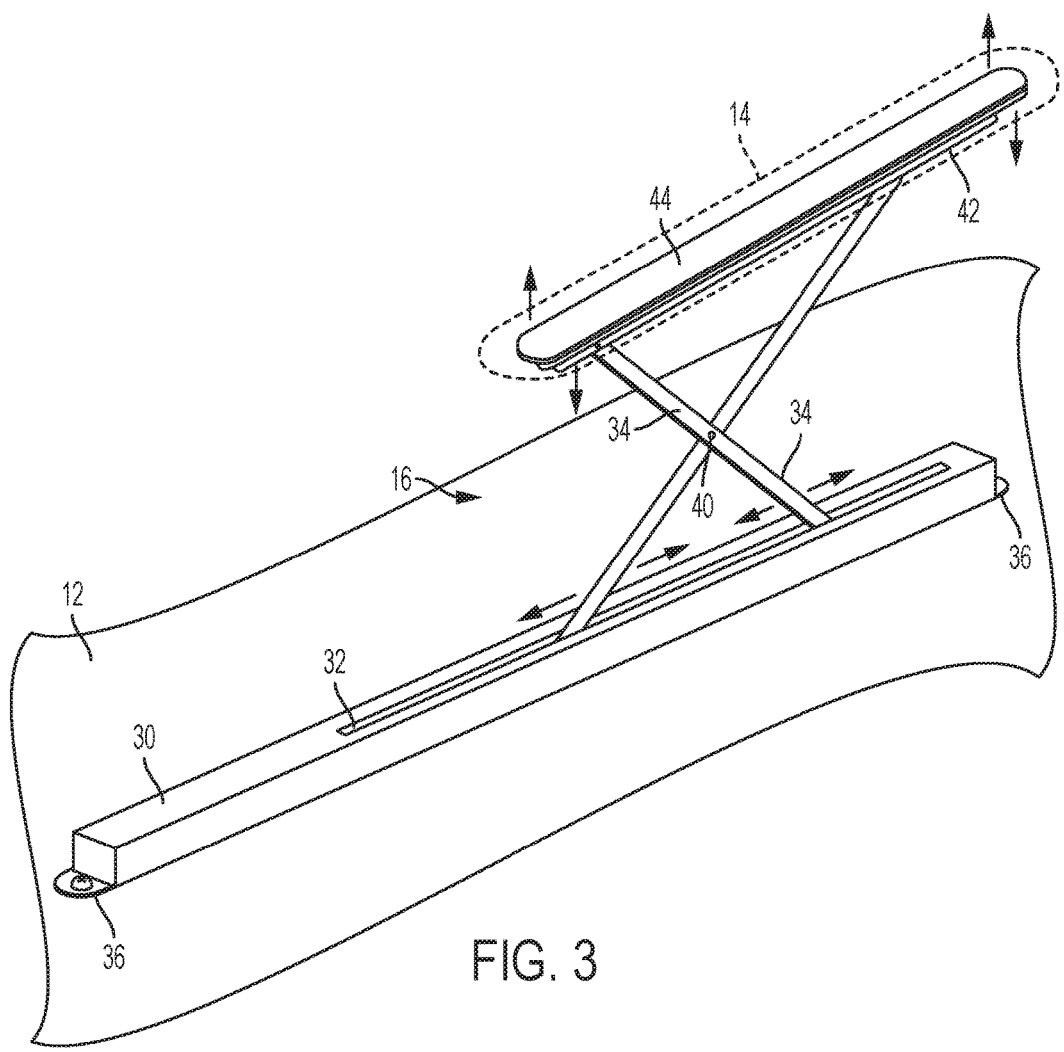
FIG. 3 is a perspective view of an exemplary raising apparatus according to an embodiment.
Figure 3A:
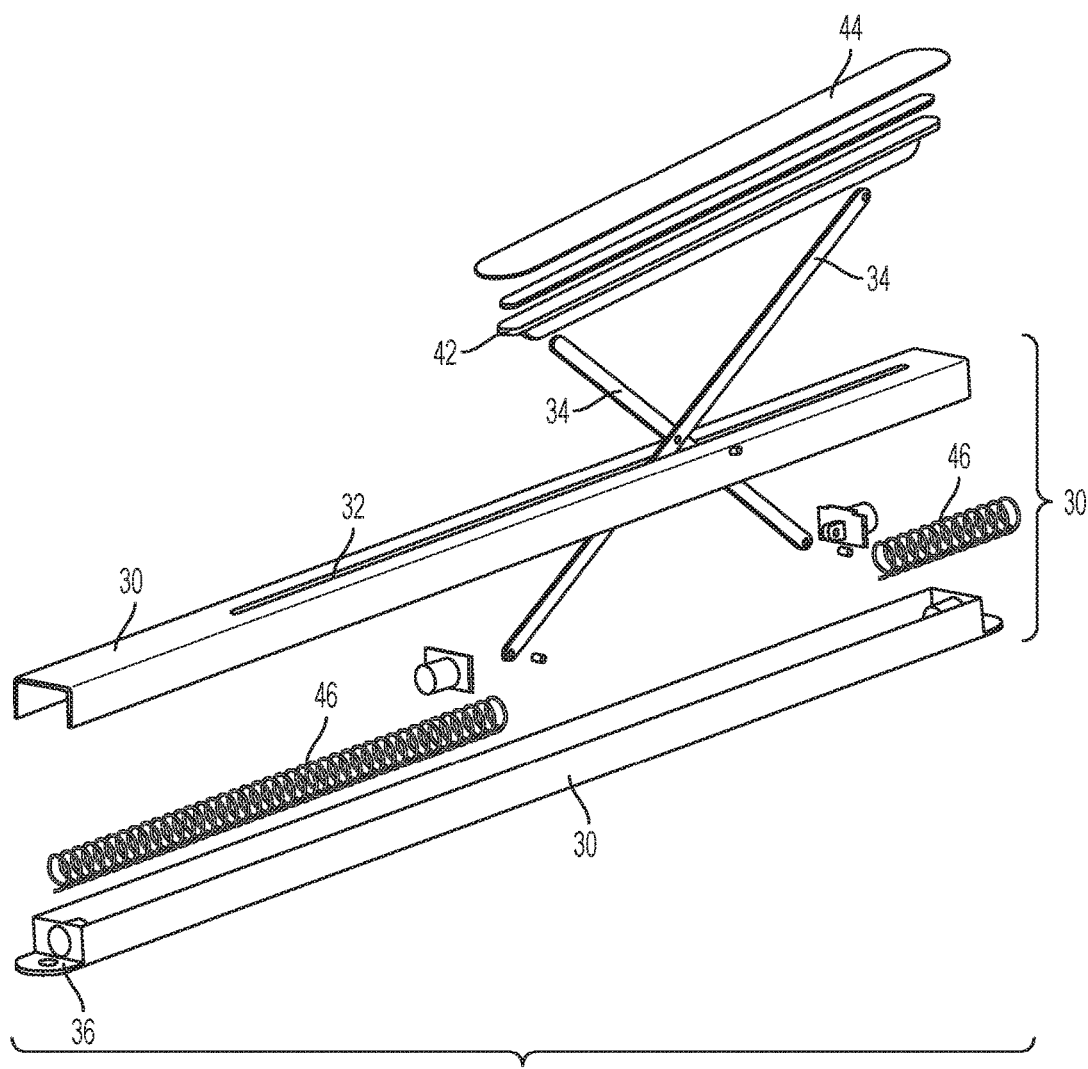
FIG. 3A is an exploded view of the exemplary raising apparatus of FIG. 3 according to an embodiment.

With reference to FIGS. 3 and 3A, raising apparatus 16 is fastened to load floor 12, for example, via joining mechanisms such as, but not limited to, screws or bolts. Raising apparatus is also operatively connected to panel 14 (e.g., via screws, bolts, etc.). The raising apparatus 16 itself includes a covered track 30 with an elongated slot 32 to define a range of motion for bars 34. Track 30 additionally includes flanges 36 to allow joining mechanisms 38 to fasten raising apparatus 16 to floor 12. The bars 34 are laterally oriented with respect to each other and are each of a different length. Bars 34 are also connected at a cross section via a rotatable joint 40 which may, for example, be a screw, bolt, or tack. As can be seen, one end of the bars 34 is located in track 30 while the opposite end is fastened to rail 42. Bars 34 consequently provide a scissor lift in which rail 42 would be oriented at the same angle as panel 14, when in the raised scissor lift orientation. Conversely, rail 42 is flattened to a horizontal orientation when the scissor lift is lowered to collapse raising apparatus 16. A pad 44 may also be attached to the topside of rail 42 to facilitate the fastening of rail 42 to panel 14.

A pair of springs 46 are positioned in the housing of track 30' and connected to the track end of the bars 34, respectively. The springs also provide force against bars 34 to allow for a default state in which rail 42 is completely raised (i.e., fully extended away from track 30). However, when sufficient downward force is applied to rail 42, the ends of bars 34 will move away from each other and their default track location and the rail 42 will lower towards track 30 through normal scissor lift movement. A sufficient amount of force may be that created from approximately ten (10) or more pounds of weight being placed indirectly upon rail 42, which may be through panel 14. It should be understood that one or more of the components of raising apparatus 16, such as, but not limited to, track 30, rail 42, bars 34, and springs 46, may be manufactured from steel.

Figure 4:
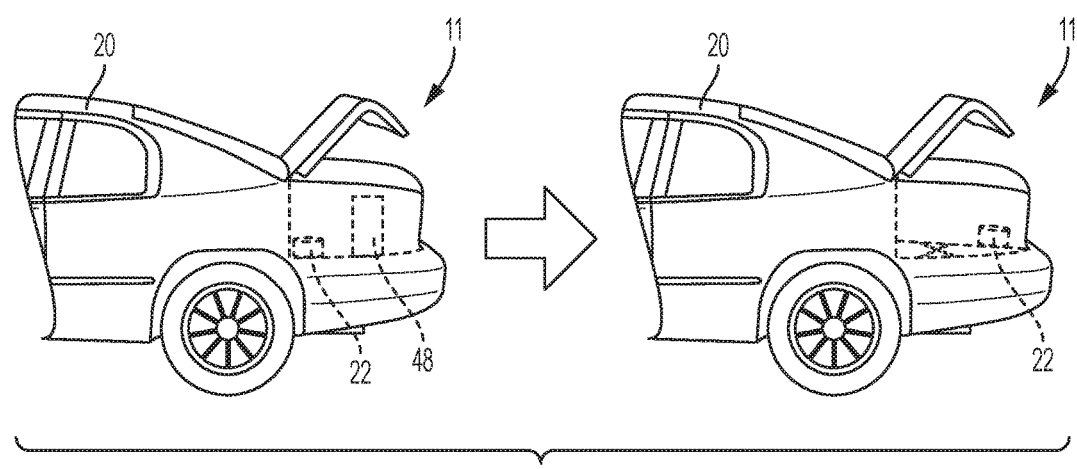
FIG. 4 is an operational view of an exemplary vehicle trunk system according to an embodiment.

As demonstrated in FIG. 4, when someone places heavy objects 48 in the vehicle trunk, panel 14 will collapse and provide trunk 11 with a flat, horizontally-oriented trunk bottom. Raising apparatus 16 thus lowers panel 14 in relation to floor 12 so as to minimize the angle of rotation 18 between the two surfaces. However, when the heavy object 48 is extracted/removed from trunk 11, raising apparatus 16 will bounce back to its default state and panel 14 will again be angularly oriented with respect to load floor 12. As a result, any lightweight objects 22 that were situated between the back end of trunk 11 and the heavy object 48 will slide towards the frontend and closer to the opening of trunk 11.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system to vary an angle of rotation between two surfaces, the system comprising:
   a horizontally-oriented fixed surface;
   a planar surface rotatably connected to one side of the fixed surface and configured to substantially cover the fixed surface; and
   a raising apparatus affixed to the fixed surface, the raising apparatus operatively connected to the planar surface, wherein, based on the amount of downward force being applied to the planar surface, the raising apparatus lowers a portion of the planar surface in relation to the fixed surface so as to reduce an angle of rotation between the planar surface and fixed surface.

2. The system of claim 1, wherein the fixed surface comprises a lip configured to ensure the portion of the planar surface does not shift out of place while lowering in relation to the fixed surface.

3. The system of claim 1, wherein the raising apparatus comprises:
   a track configured to fasten to the fixed surface;
   a rail configured to fasten to the planar surface;
   a plurality of bars, the bars being laterally orientated and connected at a cross section via a rotatable joint, each bar being of a different length, wherein one end of each bar is configured to connect to the rail and the opposite end is configured to be located in the track;
   springs configured to be installed in the track and connected to the track end of the bars; and
   wherein the springs are configured to allow the track end of the bars to move from a default track position based on the amount of downward force being applied to the rail.

4. The system of claim 3, wherein the track, rail, each of the plurality of bars, and springs are manufactured from steel.

5. The system of claim 1, wherein the system is installed within a trunk of a vehicle.

6. The system of claim 5, wherein the fixed surface is a load floor of the trunk and the planar surface is a floor mat panel installed in the trunk.

7. The system of claim 6, wherein the load floor comprises a spare tire well.

8. The system of claim 6, wherein the floor mat panel is constructed from a rigid material.

9. A system vary an angle of rotation between a rigid floor mat panel surface and load floor located in a vehicle trunk, the angle of rotation based on the amount of weight placed in the vehicle trunk, the system comprising:
   the panel surface rotatably connected to the end of the load floor that abuts the vehicle trunk opening, the panel surface being configured to cover the load floor; and
   a raising apparatus being fastened to the load floor, the raising apparatus operatively connected to the panel surface, wherein the raising apparatus, based on the amount of weight placed on the panel surface, lowers the panel surface in relation to the load floor so as to minimize the angle of rotation between the panel surface and load floor.

10. The system of claim 9, wherein the load floor comprises a lip configured to ensure the panel surface does not shift out of place while lowering in relation to the load floor.

11. The system of claim 9, wherein the raising apparatus comprises:
   a track configured to fasten to the load floor;
   a rail configured to fasten to the panel surface;
   a plurality of bars, the bars being laterally orientated and connected at a cross section via a rotatable joint, each bar being of a different length, wherein one end of each bar is configured to connect to the rail and the opposite end is configured to be located in the track;
   springs configured to be installed in the track and connected to the track end of the bars; and
   wherein the springs are configured to allow the track end of the bars to move from default track position based on the amount of weight placed on the panel surface.

12. The system of claim 11, wherein the track, rail, each of the plurality of bars, and springs are manufactured from steel.

13. A method to vary an angle of rotation between two surfaces, the method comprising:
   providing a horizontally-oriented fixed surface;
   providing a planar surface rotatably connected to one side of the fixed surface and configured to substantially cover the fixed surface; and
   providing a raising apparatus affixed to the fixed surface, the raising apparatus operatively connected to the planar surface, wherein, based on the amount of downward force being applied to the planar surface, the raising apparatus lowers a portion of the planar surface in relation to the fixed surface so as to minimize an angle of rotation between the planar surface and fixed surface;

allowing the raising apparatus to set the operatively connected planar surface at a default position, wherein the angle of rotation between the planar surface and fixed surface is maximized;

placing weight on the planar surface; and when substantial weight is placed on the planar surface, allowing the raising apparatus to lower a portion of the planar surface in relation to the fixed surface until the angle of rotation between the planar surface and fixed surface is minimized.

14. The method of claim 13, further comprising:

removing the downward force being applied to the planar surface; and allowing the raising apparatus to return the operatively connected planar surface to the default position.

15. The method of claim 13, wherein the fixed surface comprises a lip configured to ensure the portion of the planar surface does not shift out of place while lowering in relation to the fixed surface.

16. The method of claim 13, wherein the raising apparatus comprises:

a track configured to fasten to the fixed surface;

a rail configured to fasten to the planar surface;

a plurality of bars, the bars being laterally orientated and connected at a cross section via a rotatable joint, each bar being of a different length, wherein one end of each bar is configured to connect to the rail and the opposite end is configured to be located in the track;

springs configured to be installed in the track and connected to the track end of the bars; and wherein the springs are configured to allow the track end of the bars to move from their respective default track position based on the amount of downward force being applied to the rail.

17. The method of claim 16, wherein the track, rail, each of the plurality of bars, and springs are manufactured from steel.

18. The method of claim 13, wherein the fixed surface is a load floor of a vehicle trunk and the planar surface is a floor mat panel installed in the vehicle trunk.

19. The method of claim 18, wherein the load floor comprises a spare tire well.

20. The method of claim 18, wherein the floor mat panel is constructed from a rigid material.

* * * * *